United States Patent
Moon et al.

(10) Patent No.: US 7,061,886 B1
(45) Date of Patent: Jun. 13, 2006

(54) PACKET VOTING IN WIRELESS COMMUNICATIONS SYSTEMS

(75) Inventors: Billy G. Moon, Morrisville, NC (US); Malcolm M. Smith, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1145 days.

(21) Appl. No.: 09/670,055

(22) Filed: Sep. 25, 2000

(51) Int. Cl.
*H04Q 7/00* (2006.01)

(52) U.S. Cl. .................... 370/331; 370/349; 455/432.1; 455/436

(58) Field of Classification Search ................ 370/328, 370/310, 331, 401, 338, 349, 252, 395.1, 370/395.2; 455/436, 439, 428, 432.1, 553.1
See application file for complete search history.

(56) References Cited

U.S. PATENT DOCUMENTS

| | | | |
|---|---|---|---|
| 5,491,688 A | 2/1996 | Bocci et al. | 370/18 |
| 5,583,913 A * | 12/1996 | Taketsugu | 455/560 |
| 5,710,974 A * | 1/1998 | Granlund et al. | 455/436 |
| 5,719,871 A | 2/1998 | Helm et al. | 370/479 |
| 5,794,149 A | 8/1998 | Hoo | 455/438 |
| 5,850,607 A * | 12/1998 | Muszynski | 455/442 |
| 5,867,491 A | 2/1999 | Derango et al. | 370/329 |
| 5,920,817 A | 7/1999 | Umeda et al. | 455/437 |
| 6,044,270 A | 3/2000 | Raith | 455/434 |
| 6,112,058 A * | 8/2000 | Walters et al. | 455/67.11 |
| 6,151,502 A | 11/2000 | Padovani et al. | 455/442 |
| 6,233,454 B1 | 5/2001 | Sato | 455/437 |
| 6,263,204 B1 * | 7/2001 | Kusaki et al. | 455/439 |
| 6,535,738 B1 | 3/2003 | Bomar et al. | 455/436 |
| 6,603,751 B1 | 8/2003 | Odenwalder | 370/331 |
| 6,628,632 B1 | 9/2003 | Dolan | 370/332 |
| 6,647,262 B1 | 11/2003 | Demetrescu et al. | 455/436 |
| 2002/0027890 A1 | 3/2002 | Bernstein et al. | 370/331 |
| 2002/0058481 A1 | 5/2002 | Mohebbi | 455/67.1 |
| 2003/0063582 A1 * | 4/2003 | Mizell et al. | 370/328 |
| 2003/0195001 A1 | 10/2003 | Tari et al. | 455/435.2 |

* cited by examiner

*Primary Examiner*—Frank Duong
(74) *Attorney, Agent, or Firm*—Baker Botts L.L.P.

(57) ABSTRACT

A wireless communications system includes a core packet network coupled to multiple base transceiver stations, each station providing wireless services to mobile units. The system supports simultaneous, parallel, wireless communications links between a mobile unit and multiple base transceiver stations by selecting between copies of packets received by each base transceiver station. Thus, the system includes devices for selecting between multiple copies of each packet received from a mobile unit.

38 Claims, 5 Drawing Sheets

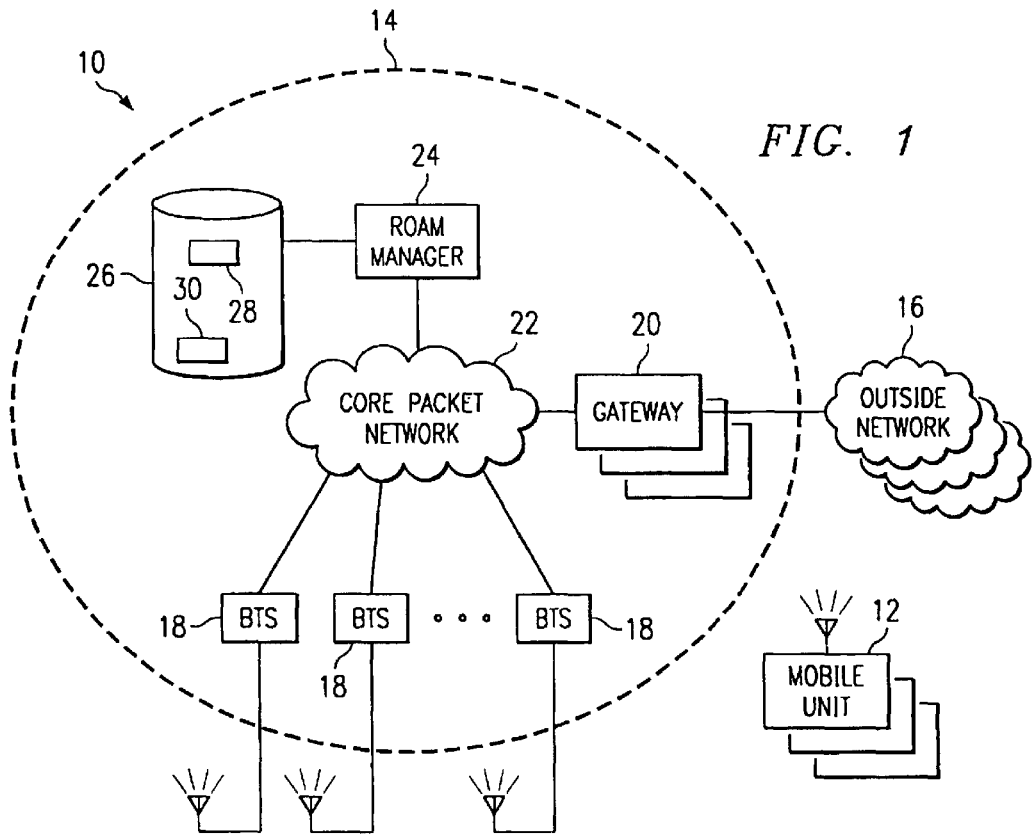

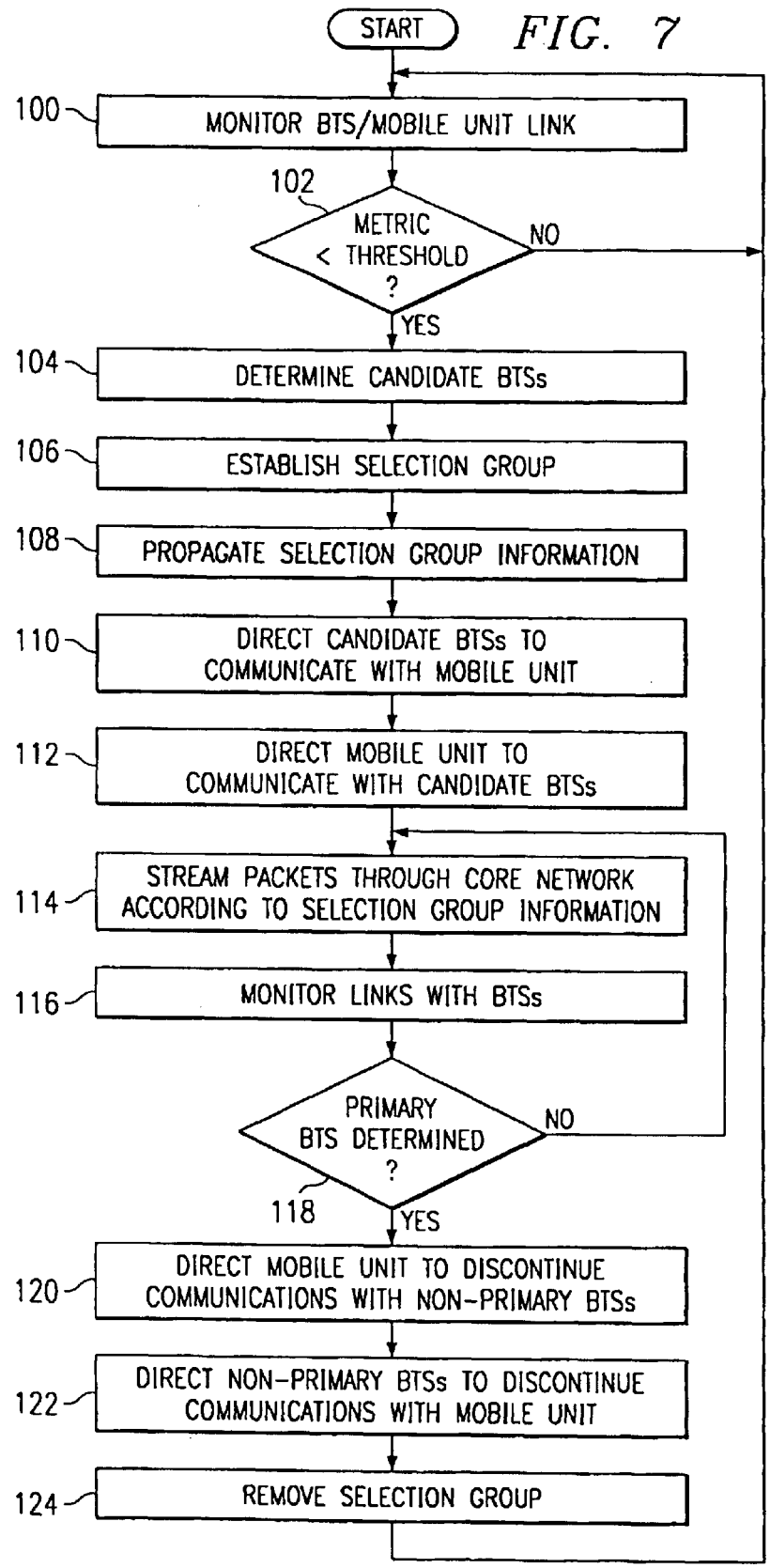

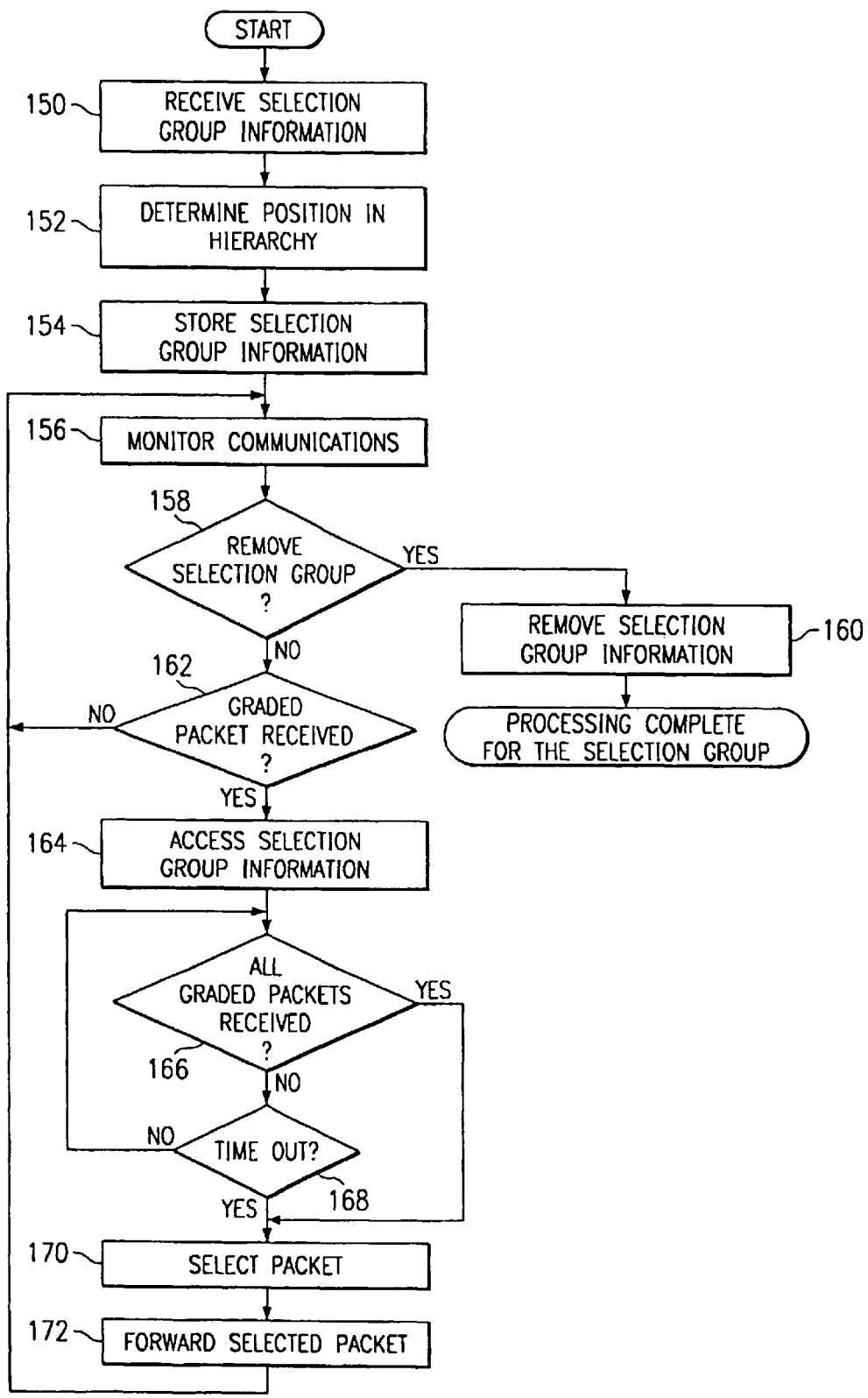

PACKET VOTING IN WIRELESS COMMUNICATIONS SYSTEMS

RELATED APPLICATIONS

This application is related to co-pending patent application entitled Generating Graded Packets for Packet Voting in Wireless Communications Systems, Ser. No. 09/669,098, filed Sep. 25, 2000, and co-pending patent application entitled Packet Voting in Wireless Mobile Devices, Ser. No. 09/670,056, filed Sep. 25, 2000.

TECHNICAL FIELD OF THE INVENTION

The present invention relates generally to wireless communications and more particularly to packet voting in communications systems.

BACKGROUND OF THE INVENTION

Typical cellular systems include base transceiver stations that provide wireless communications for cellular phones. These base transceiver stations connect to base station controllers and transmit phone calls and other data using circuit-switched, time division multiplexed communications protocols. The connections between base transceiver stations and base station controllers typically support multiple communications sessions by assigning each session to a particular time-slot within frames. Thus, multiple cell phones may simultaneously establish communications sessions via one base transceiver station, and the base transceiver station uses different time-slots for each session. The management and assignment of time-slots often requires complex algorithms making tradeoffs based on a variety of factors. As the number of cell phones increases in a given area, proper management of time-slots becomes critical.

The roaming of a cell phone between base transceiver stations during a communications session exacerbates problems in time-slot management. An established session roaming to a new base transceiver station typically requires a similar time-slot on both the original and the new base transceiver station. Therefore, time division multiplexed connections may result in inefficient use of bandwidth between base transceiver stations and base station controllers and introduces complexity to time-slot management and roaming decisions for cell phones.

SUMMARY OF THE INVENTION

In accordance with the present invention, techniques for packet voting in wireless communications systems are provided which substantially eliminate or reduce disadvantages and problems associated with previous techniques. In a particular embodiment, the present invention satisfies a need for a wireless communications system having a packet-switched core using packet voting to enable roaming of mobile units.

According to one embodiment of the present invention, a communications system includes a mobile unit that transmits information, a first base transceiver station that receives the information, determines a first value for a metric associated with communications between the mobile unit and the first base transceiver station, and generates a first graded packet encoding the first value and the information. The system also includes a second base transceiver station that receives the information, determines a second value for a metric associated with communications between the mobile unit and the second base transceiver station, and generates a second graded packet encoding the second value and the information. In addition, the system includes a router that receives the first graded packet and the second graded packet and selects one of the graded packets for further communication.

In accordance with another embodiment of the present invention, a method for communicating packets receives a first graded packet from a first base transceiver station, wherein the first graded packet encodes information received from a mobile unit and a first value generated by the first base transceiver station. The method also receives a second graded packet from a second base transceiver station, wherein the second graded packet encodes the information and a second value generated by the second base transceiver station. The method compares the first value and the second value, selects one of the graded packets based on the comparison, and forwards the selected one of the graded packets.

The invention provides a number of technical advantages. A packet-switched core enables more efficient use of resources than a circuit-switched core and eliminates complexity associated with the management of time-slots. Packet voting also enables a packet-switched core to more efficiently support roaming of mobile units between base transceiver stations. In addition, a packet network may intelligently select between copies of packets from a mobile unit received by multiple base transceiver stations. Each base transceiver station may encode metrics within received packets to facilitate selection between multiple copies of a single packet. Furthermore, a hierarchical voting structure may be used to distribute selection decisions and to reduce the propagation of redundant packets.

Packet voting may also enable intelligent conferencing of signals received from multiple sources. For example, devices in a communications system may select between packets from multiple participants in a conference call based on information encoded within each packet. With packet voting, conferencing decisions may be distributed among many devices, without requiring a centralized conference host to select between signals from the participants. Also, systems may use packet voting to provide multiple redundant links between to points. For example, to guarantee a quality connection between two points, the system may provide parallel communications paths and vote between copies of packets based on encoded metrics.

Other technical advantages of the present invention will be readily apparent to one skilled in the art from the following figures, descriptions and claims.

BRIEF DESCRIPTION OF THE DRAWINGS

For a more complete understanding of the present invention and its advantages, reference is now made to the following descriptions, taken in conjunction with the accompanying drawings, in which:

FIG. 1 illustrates a communications system having a core packet network supporting wireless communications with mobile units;

FIG. 2 is a table maintaining exemplary information for determining candidate base transceiver stations for roaming from a primary base transceiver station;

FIG. 3 is a table maintaining exemplary information for monitoring communications with a mobile unit and for selecting between candidate base transceiver stations during roaming;

FIG. 7 is a flowchart illustrating a method for communicating packets using selection groups;

FIG. 8 is a flowchart illustrating a method for participating in a packet voting selection group hierarchy.

DETAILED DESCRIPTION OF THE DRAWINGS

Figure 4:
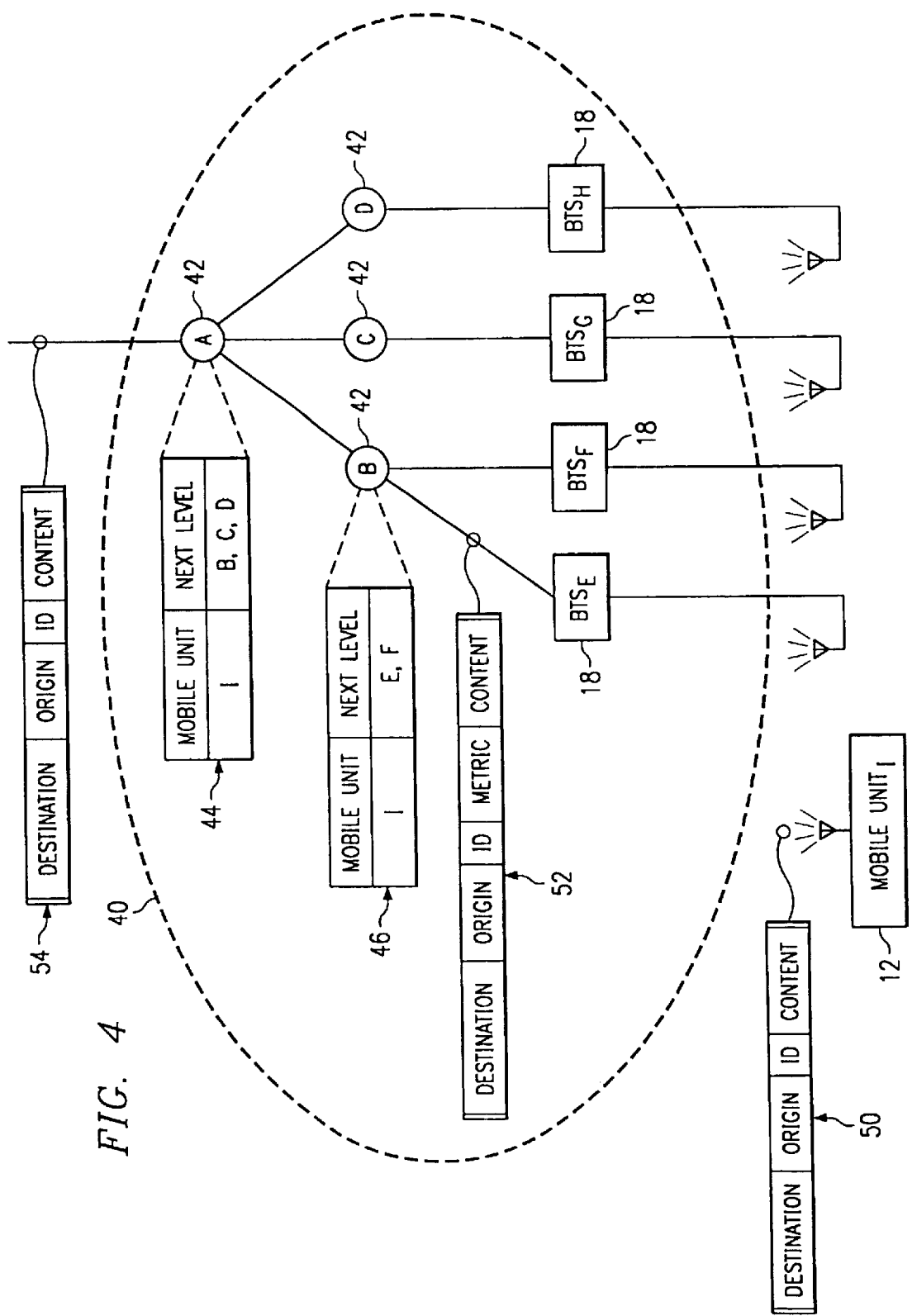
FIG. 4 is a diagram illustrating an exemplary hierarchical selection group for communicating packets received from a mobile unit by multiple base transceiver stations.

FIG. 1 illustrates a communications system, indicated generally at 10, that includes mobile units 12 coupled via wireless links to a managed network 14 that couples to outside networks 16. Managed network 14 includes base transceiver stations 18, gateways 20, a core packet network (CPN) 22, and a roam manager 24. In general, mobile unit 12 establishes a wireless link with one or more transceiver stations 18. Managed network 14 supports packet voting between multiple copies of each packet received from mobile unit 12. More specifically, CPN 22 may select between copies of a packet received from mobile unit 12 by multiple transceiver stations 18, and gateway 20 may forward a selected one of the copies to an appropriate outside network 16.

Mobile units 12 provide wireless communications using any suitable wireless communications protocol and may establish wireless links with transceiver stations 18 in managed network 14. For example, mobile units 12 may be analog or digital cellular telephones, personal digital assistants (PDAs), pagers, or other suitable wireless devices providing wireless services for subscribers. Wireless links represent any channel or channels established between devices for the persistent, periodic, or sporadic communication of information via any suitable wireless communications protocols. Managed network 14 represents any collection and arrangement of components each aware of the topology within managed network 14. That is, each component of managed network 14 may access information describing the network layout for other components of managed network 14. This information may include network addresses, routing tables, or other suitable information. Thus, for example, if managed network implements Internet Protocol (IP) communications, each component of managed network 14 may be aware of the IP addresses for other components in managed network 14.

Transceiver stations 18 represent hardware and/or software supporting wireless links with mobile units 12 using any suitable wireless communications protocol. Transceiver stations 18 receive information from mobile units 12 in packets or receive information from mobile units and packetize the information for packet-switched communication via CPN 22. CPN 22 represents any collection and arrangement of hardware and/or software providing packet-switched communications between transceiver stations 18, gateways 20, and roam managers 24. For example, CPN 22 may include routers, bridges, gateways, switches, or other suitable network equipment providing packet-switched communications.

Gateways 20 represent hardware and/or software linking managed network 14 to outside networks 16, such as mobile switching centers (MSCs), network gateways, or other suitable equipment. For example, gateways 20 may link to the public switched telephone network (PSTN), a global computer network such as the Internet, local area networks (LANs), wide area networks (WANs), or other communications networks. Moreover, gateways 20 may support conversions between the packet-switched communications supported by CPN 22 and protocols used by outside networks 16. For example, gateway 20 may communicate information with CPN 22 using packet-switched protocols while providing circuit-switched communications with selected outside networks 16.

Roam manager 24 represents hardware and/or software that monitors, manages and controls wireless links between mobile units 12 and transceiver stations 18. As part of this management and control, roam manager 24 facilitates the roaming of mobile units 12 between transceiver stations 18. Roaming refers to any activities supporting communications between mobile unit 12 and multiple transceiver stations 18 or supporting movement of mobile units 12 between areas serviced by different transceiver stations 18 or other wireless services equipment. Therefore, roam manager 24 supports management and control of links between mobile units 12 and transceiver stations 18 to provide substantially uninterrupted wireless services. While roam manager 24 is illustrated as a separate component of managed network 14, system 10 contemplates incorporating the functionalities of roam manager 24 into any suitable components. That is, devices in CPN 22, gateways 20, transceiver stations 18, mobile units 12 and/or other suitable equipment may provide some or all of the functions of roam manager 24. Moreover, any of the functionalities of roam manager 24 may be separated and distributed among components of system 10 and may be implemented using any suitable combination of hardware and/or software.

To facilitate management and control of roaming of mobile units: 12, roam manager 24 may access information stored in a memory 26. Memory 26 represents any one or combination of volatile or non-volatile, local or remote devices suitable for storing data, for example, random access memory (RAM) devices, read only memory (ROM) devices, magnetic storage devices, optical storage devices, or any other suitable data storage devices. In a particular embodiment, memory 26 stores a candidate table 28 and a link table 30. Candidate table 28 maintains information for selecting candidate transceiver stations 18 for roaming from an original transceiver station 18, and link table 30 maintains information for monitoring wireless links between transceiver stations 18 and mobile units 12.

In operation, mobile unit 12 establishes a communications session with a remote location via a wireless link with a selected transceiver station 18 in managed network 14. The communications session may use any suitable connection-oriented or connection-less, synchronous or asynchronous protocols. Establishing the session may result from mobile unit 12 initiating a telephone call, receiving a telephone call, establishing a data session, transmitting or receiving a page, roaming into an area, or any other suitable event. Transceiver station 18 monitors the wireless link and communicates information describing the link to roam manager 24. These communications include any information describing the link, such as signal strength, bit error rate (BER), carrier-to-noise ratio (CNR), signal-to-noise ratio (SNR), or other suitable metrics. Roam manager 24 may maintain this information using link table 30. During the communications session, CPN 22 routes packets associated with the session to an appropriate gateway 20. However, if the remote location is serviced by a selected transceiver station 18 in managed network 14, then CPN 22 may stream packets between transceiver station 18 communicating with mobile unit 12 and transceiver station 18 communicating with the remote location.

Roam manager 24 monitors the link based on information received from transceiver station 18 and, if an appropriate trigger occurs, initiates roaming of mobile unit 12. For example, transceiver station 18 may report signal strength to roam manager 24, and, when the signal strength drops below a threshold, roam manager 24 initiates roaming of mobile unit 12. Given an appropriate triggering event, roam manager 24 determines candidate transceiver stations 18 for roaming. Candidate transceiver stations 18 include potential stations for establishing a new wireless link with mobile unit 12. Roam manager 24 may determine candidate transceiver stations 18 based on the original transceiver station 18, for example, by determining transceiver stations 18 in areas adjacent to the original transceiver station 18. In a particular embodiment, roam manager 24 accesses candidate table 28 to determine candidate transceiver stations 18 based on the original transceiver station 18. However, system 10 contemplates roam manager 24 using any suitable techniques or information for determining candidate transceiver stations 18 for roaming.

After determining candidate transceiver stations 18, roam manager 24 directs the establishment of links between candidate transceiver stations 18 and mobile unit 12. This may include instructing candidate transceiver stations 18 to communicate with mobile unit 12 using appropriate protocols and similarly instructing mobile unit 12 to communicate with candidate transceiver stations 18. For example, consider mobile unit 12 roaming in a system using Walsh code/frequency combinations (typical of code division multiple access (CDMA) systems) for wireless links between mobile unit 12 and transceiver stations 18. To set up links between mobile unit 12 and multiple candidate transceiver stations 18, roam manager 24 may instruct candidate transceiver stations 18 to send outbound packets to mobile unit 12 using particular Walsh code/frequency combinations and to receive inbound packets from mobile unit 12 using a separate Walsh code/frequency combination. In addition, roam manager 24 may instruct mobile unit 12 to receive packets from candidate transceiver stations 18 using the specified Walsh code/frequency combinations. This establishes multiple, parallel, wireless links between mobile unit 12 and transceiver stations 18. Therefore, each candidate transceiver station 18 and the original transceiver station 18 may receive a copy of each packet transmitted by mobile unit 12, and mobile unit 12 may receive packets from each candidate transceiver station 18 and the original transceiver station 18. While this example focuses on specific protocols, system 10 contemplates mobile units 12 and transceiver stations 18 establishing wireless links using any suitable communications protocols. Moreover, while this example includes mobile unit 12 establishing a single link and then roaming between a group of transceiver stations 18, system 10 contemplates mobile unit 12 continuously roaming between multiple transceiver stations 18.

In addition to directing communications between transceiver stations 18 and mobile unit 12, roam manager 24 may also establish a selection group associated with the communications session to aid in streaming multiple copies of inbound and outbound packets through managed network 14. For example, managed network 14 may use the selection group to select from multiple copies of each inbound packet received from mobile unit 12 and to distribute copies of each outbound packet to transceiver stations 18 communicating with mobile unit 12. To establish the selection group, roam manager 24 may include the original transceiver station 18 providing a wireless link to mobile unit 12 and candidate transceiver stations 18.

After determining transceiver stations 18 in the selection group, roam manager 24 propagates this selection group information to devices in managed network 14, including components of CPN 22. This propagation establishes a hierarchy for selecting between multiple copies of each packet received by transceiver stations 18 in the selection group. As previously discussed, during roaming of mobile unit 12, each transceiver station 18 in the selection group receives a copy of each packet transmitted by mobile unit 12. The selection group hierarchy provides a mechanism for selecting one of the copies of each packet transmitted by mobile unit 12 to communicate to the remote location.

In addition, devices in managed network 14 may use this selection group hierarchy to control the distribution of outbound packets (packets from the remote location to mobile unit 12). For example, the selection group hierarchy may fan out a single packet from the remote location, resulting in each transceiver station 18 in the selection group receiving a copy of the packet. Each transceiver station 18 in the selection group then transmits its copy of the packet to mobile unit 12, allowing mobile unit 12 to select the best available packet or otherwise combine or select from multiple copies of each packet received. Therefore, managed network 14 may use the selection group to aid in distribution of copies of outbound packets and to enable hierarchical packet voting resulting in a single copy of each inbound packet.

To aid in this packet voting, components in system 10 encode metrics or other information in each inbound packet to enable selection between multiple copies of each inbound packet. In a particular embodiment, transceiver stations 18 determine a metric associated with each packet received from mobile unit 12 and generate a graded packet encoding this metric and the contents of the original packet. Transceiver stations 18 generate graded packets using any metric or metrics, such as signal strength, BER, CNR, SNR, or other suitable metrics. Thus, components in managed network 14 differentiate between copies of each packet based on the metrics or other information encoded in the graded packets. This allows a component receiving multiple copies of a packet, as graded packets, to intelligently select one of the graded packets to forward.

For example, consider mobile unit 12 communicating with two transceiver stations 18 of a selection group. Each transceiver station 18 receives a copy of an inbound packet, determines a metric associated with the wireless link to mobile unit 12, generates a graded packet encoding this metric and the inbound packet, and forwards the graded packet to CPN 22. An element of CPN 22 (or gateway 20) receives the two graded packets, selects one of the packets based on the encoded metrics, and then forwards the selected packet. Thus, managed network 14 votes between multiple copies of a packet based on encoded metrics. System 10 contemplates using any suitable metrics or techniques for selecting between multiple copies of a packet. Furthermore, while these examples focus on wireless communications applications, similar techniques and methods may be used for other applications that may benefit from packet voting, such as conferencing or collaboration over wireless or wireline networks.

During roaming, roam manager 24 may also monitor wireless links between roaming mobile units 12 and transceiver stations 18 to determine when to terminate roaming and remove selection groups. In a particular embodiment, transceiver stations 18 monitor wireless links with mobile units 12, generate monitoring information, and communicate monitoring information to roam manager 24. For example, each transceiver station 18 continuously, periodically, or sporadically communicates values for metrics measuring characteristics associated with wireless links between that transceiver station 18 and mobile units 12. Monitoring information may include any suitable metrics, such as signal strength, BER, CNR, and SNR. Memory 26 may store monitoring information in link table 30. Based on this and/or other information, roam manager 24 determines when to terminate roaming and remove selection groups for mobile units 12. For example, roam manager 24 may monitor each wireless link for mobile unit 12 communicating with multiple transceiver stations 18. When one of the links meets certain criteria, roam manger 24 may terminate roaming and remove the selection group associated with that mobile unit 12, allowing mobile unit 12 to continue wireless communications with a selected primary transceiver station 18.

System 10 contemplates roam manager 24 using any suitable techniques and information for determining when to terminate roaming of mobile units 12 and to remove selections groups. Moreover, roam manager 24 may support "soft" roaming of mobile units 12. In soft roaming, roam manager 24 adds and removes transceiver stations 18 from the selection group at any time without terminating the selection group. Thus, roam manager 24 may continuously maintain a selection group for mobile unit 12, modifying the membership of the group as appropriate.

To terminate roaming, roam manager 24 suspends communications between mobile unit 12 and transceiver stations 18 in the selection group not selected as the primary transceiver station 18. In a particular embodiment, roam manager 24 instructs the non-primary transceiver stations 18 to stop communicating outbound packets to mobile unit 12 and to stop receiving inbound packets from mobile unit 12, and roam manager 24 instructs mobile unit 12 to stop receiving packets from the non-primary transceiver stations 18. This results in a single wireless link between mobile unit 12 and primary transceiver station 18. In addition to terminating roaming, roam manager 24 may also remove the selection group associated with mobile unit 12. For example, roam manager 24 issues a command to elements in managed network 14 requesting all elements to stop streaming packets according to the selection group. As a result, managed network 14 discontinues packet voting according to the selection group hierarchy and discontinues copying of outbound packets to multiple transceiver stations 18. While the preceding examples illustrate particular embodiments, system 10 contemplates roam manager 24 using any appropriate techniques for terminating roaming of mobile units 12 and for removing selection groups.

Moreover, managed network 14 may implement soft roaming using dynamic selection groups and, as previously discussed, may distribute selection group and roaming management among components in system 10. For example, each transceiver station 18 may monitor signals from mobile units 12, such as communications control signals, to determine mobile units 12 within an effective range of that transceiver station 18. This includes, for example, transceiver station 18 determining all mobile units 12 that have a signal strength that exceeds a threshold. Based on these determinations, each transceiver station 18 registers with selection groups for mobile units 12 within range and drop from selection groups for mobile units 12 that have moved out of range. Furthermore, mobile units 12 may monitor signals and add or remove transceiver stations 18 from selection groups. This provides selection groups that dynamically add and remove members based on distributed management. However, system 10 contemplates managed network 14 using any distribution or centralization of roaming and selection group management functions.

FIG. 2 illustrates an exemplary candidate table 28 maintained by memory 26. Candidate table 28 includes entries for candidate transceiver stations 18 indexed according to a primary transceiver station 18. Elements in system 10, such as roam manager 24, may use information in candidate table 28 to aid in managing and controlling roaming of mobile units 12 and in establishing selection groups. This exemplary candidate table 28 lists candidate transceiver stations 18 for two primary transceiver stations 18, stations E and F. For example, consider mobile unit 12 participating in a communication session using a wireless link with station E. Roam manager 24, monitoring this link, may determine that mobile unit 12 should roam between transceiver stations 18. Roam manager 24 accesses candidate table 28 and determines that mobile units 12 roaming from station E potentially roam to stations F, G, or H. Based on this determination, roam manager 24 establishes a selection group including stations E, F, G, and H and initiates roaming of mobile unit 12. Candidate table 28 illustrates only a particular embodiment for maintaining candidate information. System 10 contemplates using any suitable information maintained in any appropriate form for assisting with roaming decisions.

FIG. 3 illustrates an exemplary link table 30 maintained by memory 26. Roam manager 24 may access link table 30 to determine appropriate times for initiating and terminating roaming of mobile units 12. For each mobile unit 12 monitored by roam manager 24, link table 30 maintains monitoring information for wireless links between transceiver stations 18 and mobile units 12. This information includes any suitable metrics, reports, or other data, such as signal strength, BER, CNR, SNR, or other suitable information. This exemplary link table 30 illustrates link information for two mobile units 12, mobile units I and K. For example, link table 28 indicates that mobile unit I is currently communicating with stations E, F, G, and H. These transceiver stations 18 may represent members of a selection group established by roam manager 24 to facilitate roaming of mobile unit I. Table 30 also indicates that mobile unit K is currently communicating with station F. Thus mobile unit K, in this example, is not currently roaming. While this example includes specific metrics monitored by roam manager 24, system 10 contemplates roam manager 24 monitoring and link table 30 maintaining any suitable metrics for determining characteristics of wireless links between mobile units 12 and transceiver stations 18.

FIG. 4 illustrates an exemplary selection group hierarchy 40 established within managed network 14 that includes routers 42 and transceiver stations 18 for a selection group associated with mobile unit 12. Hierarchy 40 illustrates the operation of components in managed network 14 in accordance with an exemplary selection group hierarchy. In general, elements in hierarchy 40 may stream inbound and outbound packets associated with a communications session according to a selection group established for mobile unit 12. Routers 42 select between copies of inbound packets at each juncture, and thus hierarchy 40 may ultimately forward a single copy of each inbound packet from mobile unit 12. Hierarchy 40 may also generate multiple copies of outbound packets such that each transceiver station 18 receives copies of each outbound packet destined to mobile unit 12.

Routers 42 represent hardware and/or software components in managed network 14 that receive and forward packets and select between multiple copies of packets. For example, routers may be gateways 20, elements of CPN 22, or other suitable devices. Routers 42 may include an interface for communicating with other elements in system 10 and a processor for controlling the operation of router 42. These components may be implemented using any suitable combination or separation of modules using hardware and/or software components.

This illustration includes exemplary network addresses for each element. Thus, routers 42 have network addresses A, B, C, and D, transceiver stations 18 have network addresses E, F, G, and H, and mobile unit 12 has a network address of I. In addition, this example includes selection group information for various routers 42 illustrated as a first selection table 44 (maintained by router A) and a second selection table 46 (maintained by router B). Tables 44 and 46 each identify mobile unit 12 associated with the selection group (mobile unit I) and network addresses for devices in the next lower level of hierarchy 40. For each inbound packet, routers 42 select from copies of the packet received from each device on the next lower level. For example, router A selects between copies of inbound packets received from routers B, C, and D. Similarly, router B selects between copies of packets received from stations E and F. Some elements of hierarchy 40, such as routers C and D, may simply forward packets without selecting between multiple copies.

Consider an inbound packet 50 transmitted by mobile unit I. In this example, packet 50 includes an origin, destination, identifier (ID), and content. The identifier may include a sequence number or other information for identifying the packet. Stations E, F, G, and H each receive a copy of packet 50, determine a metric associated with the wireless communications link with mobile unit I, generate a graded packet encoding the metric and information from the original inbound packet, and then forward the graded packet up hierarchy 40. For example, station E receives packet 50, determines a metric associated with communications between station E and mobile unit I, generates a graded packet 52 encoding this metric and information from the inbound packet, and forwards graded packet 52 to router B. Therefore, in this example, graded packet 52 includes the origin, destination, ID, and content of packet 50 as well as an encoded metric. Station F performs similar functions upon receiving the inbound packet. Routers 42 determine the group of graded packets from which to select based on the identifiers encoded in the packets.

Thus, router B receives graded packets from stations E and F, selects one of these packets based on the encoded metrics, and forwards the selected graded packet to router A. Routers C and D simply forward graded packets received from stations G and H to router A. At the final selection point, router A receives graded packets from routers B, C, and D, selects between these graded packets based on the encoded metrics, and forwards a selected packet 54. Therefore, hierarchy 40 may, support a distributed selection process that allows mobile unit 12 to communicate with multiple transceiver stations 18 and provides intelligent selection between copies of packets received using multiple wireless links.

Using these techniques, hierarchy 40 may select the copy of each inbound packet with the highest potential for quality. For example, transceiver stations 18 may grade packets based on a signal strength associated with communications with mobile unit 12 while receiving the packet. Hierarchy 40 may then select between copies of packets based on signal strength and, for each inbound packet, forward the copy received on the wireless link having the highest signal strength for copies of that packet. In addition, hierarchy 40 may remove any metrics from the final packet selected. For example, router A may remove any metrics from the final selected packet, thus forwarding a single packet identical to the original packet transmitted by mobile unit I. Hierarchy 40 illustrates this, having selected packet 54 identical to packet 50 transmitted by mobile unit I.

While this example illustrates specific network elements and techniques for selecting between packets from multiple transceiver stations 18, system 10 contemplates using any suitable methods and criteria for selecting between multiple copies of a single packet. Moreover, these selection techniques may be used in any system requiring selection between copies of packets. For example, similar selection techniques may be used to establish multiple parallel paths for communications between two points or to facilitate conferencing functions.

Also, while this example focuses on packet-based communication between transceiver station 18 and mobile unit 12, system 10 contemplates wireless communications taking place using any appropriate techniques. Thus transceiver station 18 may receive information from mobile units 12 using any suitable protocols and then generate graded packets encoding the information and associated metrics. This information may include digital data, packets, voice information, control signals, video, telemetry data, and/or other suitable information. In addition, selection information, such as tables 44 and 46, may be maintained in any suitable form enabling centralized or distributed management of selection group information. Furthermore, routers 42 may selectively combine information from one or more packets.

For outbound communications, managed network 14 may use hierarchy 40 to distribute copies of outbound packets to each transceiver station 18 communicating with mobile unit 12. For example, consider a single outbound packet for transmission to mobile unit I received by router A. Router A accesses selection group information, such as information stored in first table 44, determines that routers B, C, and D are in the next level of hierarchy 40, and forwards copies of the outbound packet to these routers 42. Similarly, routers B, C, and D each access selection group information and, based on this information, forward copies of the outbound packet to appropriate recipients. Thus, for this example, router B forwards copies of the outbound packet to stations E and F, router C forwards the outbound packet to station G, and router D forwards the outbound packet to station H. Thus, stations E, F, G, and H may each communicate a copy of the outbound packet to mobile unit I.

Therefore, when roaming, mobile unit I may receive a copy of each outbound packet from multiple transceiver stations 18. As previously discussed, mobile unit I may then select between the copies of each packet using any suitable selection criteria. For example, mobile unit I may select between copies based on signal strengths of wireless links with transceiver stations 18. Moreover, mobile unit I may combine information from each copy of a packet received to construct a more accurate packet than any of the individual copies. However, system 10 contemplates mobile units 12 using any suitable techniques and criteria to select between and/or combine multiple copies of received packets.

In addition, while this example illustrates managed network 14 using hierarchy 40 to distribute copies of outbound packets, system 10 contemplates using any suitable techniques or information to facilitate the distribution of copies of outbound packets to multiple transceiver stations 18. For example, managed network 14 may use different information, hierarchies, techniques, or groups to distribute outbound packets than are used for selecting between inbound packets.

Figure 5:
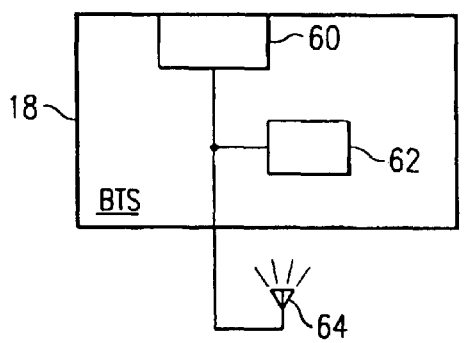
FIG. 5 is a block diagram illustrating functional components of an exemplary base transceiver station.

FIG. 5 illustrates functional elements of an exemplary transceiver station 18 having a network interface 60, a processor 62, and a wireless interface 64. In general, transceiver station 18 facilitates communications between mobile units 12 and other devices via wireless communications with mobile units 12. This may include transceiver station 18 monitoring wireless links with mobile units 12, registering and withdrawing from selection groups, generating graded packets encoding metrics associated with the wireless links, and performing other appropriate functions. More specifically, transceiver station 18 may determine values for metrics associated with wireless links with mobile units 12 and encode these values in packets for communication.

Transceiver station 18 couples to CPN 22 using network interface 60 and couples to mobile units 12 using wireless interface 64. Network interface 60 communicates with CPN 22 using any suitable wireline or wireless technology employing packet-based protocols. Similarly, wireless interface 64 communicates via wireless links with mobile units 12 using any suitable wireless communications protocols. For example, transceiver station 18 and mobile unit 12 may communicate using packet-based communications or may communicate using other suitable techniques. Processor 60 controls management and operation of the elements of transceiver station 18 using any suitable controlling hardware and/or software.

In operation transceiver station 18 handles both inbound communications received from mobile unit 12 and outbound communications for transmission to mobile unit 12. For inbound communications, as previously discussed, transceiver station 18 receives packets or other communications from mobile unit 12, determines a value for a metric associated with the wireless link with mobile unit 12, and generates a packet encoding the information from mobile unit 12 and the value for the metric. Transceiver station 18 then communicates this graded packet to CPN 22 for selection and transmission and discussed above.

For outbound communications to mobile unit 12, transceiver station 18 receives packets from CPN 22 using network interface 60. Transceiver station 18 then forwards the outbound packets to mobile unit 12 or performs some processing of the packets before communicating the packets or the information contained in the packets to mobile unit 12. For example, transceiver station 18 may remove the information contained in the packets and communicate this information to mobile unit 12 using a non-packet-based communications protocol.

In a particular embodiment, transceiver station 18 alters outbound packets for communication to mobile unit 12. To offload computational requirements from mobile unit 12, transceiver station 18 may generate graded packets for communication to mobile unit 12. Mobile unit 12, receiving multiple copies of a packet from multiple transceiver stations 18, may then select between the graded copies using a relatively simple comparator or other appropriate hardware or software. According to this embodiment, mobile unit 12 need not monitor the wireless links with various transceiver stations 18 when selecting between multiple copies of incoming packets. Rather, mobile unit 12 may select between these copies based on the metrics encoded by transceiver stations 18. This reduces the complexity required for mobile units 12 by having transceiver stations 18 monitor and encode metrics for wireless links.

While this example includes specific functional elements for transceiver station 18, system 10 contemplates transceiver station 18 containing any collection and arrangement of elements. Moreover, system 10 contemplates implementing each of the functional elements within development server 12 using any suitable combination and arrangement of hardware and/or software and implementing any of the functionalities using a computer program stored on a computer readable medium.

Figure 6:
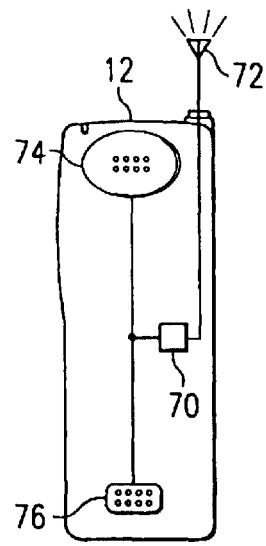
FIG. 6 is a block diagram illustrating functional components of an exemplary mobile unit.

FIG. 6 illustrates functional elements of an exemplary mobile unit 12 having a processor 70, a wireless interface 72, an output device 74, and an input device 76. In general, mobile unit 12 provides wireless communications using wireless interface 72 to couple with transceiver stations 18. More specifically, mobile unit 12 may select between multiple copies of packets received from transceiver stations 18 based on metrics encoded in the packets.

In operation, mobile unit 12 receives voice information from a user via input device 76 and communicates information to the user via output device 74. In a particular embodiment, input device 76 represents a microphone for receiving voice information, and output device 74 represents a speaker for generating audio output. However, input device 76 and output device 74 may represent any suitable input and output devices for receiving and communicating audio signals, data communications, and other appropriate information.

According to a particular embodiment, mobile unit 12 communicates with transceiver stations 18 using packet-based communications and selects between copies of packets received from multiple transceiver stations 18 based on metrics encoded in the packets. For example, multiple transceiver stations 18 may receive copies of a packet for communication to mobile unit 12. Each of these transceiver stations 18 encodes a metric in the packet as previously discussed and communicates the graded packet to mobile unit 12. Thus mobile unit 12 receives multiple graded packets from transceiver stations 18. Mobile unit 12 then selects one of the graded packets based on the encoded metrics. This permits mobile unit 12 to quickly select between multiple copies of packets without requiring mobile unit 12 to monitor wireless links, thus reducing the complexity required for mobile unit 12.

While this example includes specific functional elements for mobile unit 12, system 10 contemplates mobile unit 12 containing any collection and arrangement of elements. Moreover, system 10 contemplates implementing each of the functional elements within mobile unit 12 using any suitable combination and arrangement of hardware and/or software and implementing any of the functionalities using a computer program stored on a computer readable medium.

FIG. 7 is a flowchart illustrating a method for monitoring wireless links between mobile unit 12 and transceiver stations 18 and for establishing a selection group to facilitate roaming of mobile unit 12 between transceiver stations 18. Initially, mobile unit 12 establishes a communications session using a wireless link with transceiver station 18. Roam manager 24 monitors metrics for the wireless link between transceiver station 18 and mobile unit 12 at step 100. As previously discussed, roam manager 24 may monitor any suitable metrics for determining characteristics of the wireless communications link and may also access link table 30, or roam manager 24 may receive reports or requests from mobile unit 12 or transceiver stations 18 to initiate roaming. Roam manager 24 determines whether the metrics have fallen below a threshold at step 102. If not, roam manager 24 continues monitoring the link at step 100. However, if the metrics fall below a threshold, roam manager 24 initiates roaming of mobile unit 12 beginning at step 104.

As part of initiating roaming, roam manager 24 determines candidate transceiver stations 18 at step 104. As previously discussed, candidate transceiver stations 18 may, for example, include transceiver stations 18 in physical proximity to the current transceiver station 18 communicating with mobile unit 12. To determine candidate transceiver stations 18, roam manager 24 may access candidate table 28. However, system 10 contemplates roam manager 24 determining candidate transceiver stations 18 using any suitable equipment and/or methods, such as responsive to requests or commands from mobile unit 12 or transceiver stations 18. Roam manager 24 then establishes a selection group including the current transceiver station 18 communicating with mobile unit 12 and candidate transceiver stations 18 at step 106. This may include, for example, determining a metric for use in selecting between copies of packets received from multiple locations. Roam manager 24 propagates selection group information to elements in managed network 14 at step 108. This propagation establishes the hierarchical structure, as illustrated by hierarchy 40, for selecting between copies of packets received by multiple transceiver stations 18. By determining candidate transceiver stations 18, establishing a selection group, and propagating this selection group throughout managed network 14, roam manager 24 establishes a mechanism for receiving copies of packets from mobile unit 12 using multiple transceiver stations 18, streaming these packets through managed network 14, and selecting a single copy of each packet to forward to a remote destination.

Roam manager 24 may also direct the establishment of communications between transceiver stations 18 and mobile unit 12 at steps 110 and 112. At step 110, roam manager 24 directs candidate transceiver stations 18 to communicate with mobile unit 12, thus setting up multiple wireless links between managed network 14 and mobile unit 12. In addition, roam manager 24 directs mobile unit 12 to communicate with candidate transceiver stations 18 at step 112. Because transceiver stations 18 and mobile units 12 may support wireless communications using any suitable wireless communications protocol, roam manager 24 directs communications between transceiver stations 18 and mobile units 12 using the appropriate protocol or protocols.

For example, in a CDMA system, roam manager 24 may instruct transceiver stations 18 to transmit communications to mobile unit 12 using particular Walsh code/frequency combinations and to receive transmission from mobile unit 12 using a particular Walsh code/frequency combination. Similarly, roam manager 24 may instruct mobile unit 12 to receive transmissions using the various Walsh code/frequency combinations assigned to candidate transceiver stations 18. These steps permit mobile unit 12 to establish parallel wireless links with multiple transceiver stations 18 for the communication of packets associated with a communications session.

Accordingly, each transceiver station 18 in the established selection group may receive copies of each inbound packet transmitted by mobile unit 12. These packets stream through CPN 22 according to the established selection group at step 114. This may include hierarchically selecting between copies of each packet received by multiple transceiver stations 18. The discussion above with respect to hierarchy 40 illustrates exemplary operation of a particular embodiment for streaming packets according to selection group information. However, system 10 contemplates using any suitable techniques for selecting between copies of packets and copying packets to multiple transceiver stations 18.

While the selection group is operating, roam manager 24 monitors links with transceiver stations 18 in the selection group at step 116. Through this monitoring, roam manager 24 may determine whether a selected one of these transceiver stations 18 should be chosen from among the group as the primary transceiver station 18. As previously discussed, roam manager 24 may monitor any suitable metrics associated with wireless links between transceiver stations 18 and mobile unit 12. For example, each transceiver station 18 may continuously, periodically, or sporadically communicate a metric indicating some characteristic associated with wireless communications between that transceiver station 18 and mobile unit 12. Based on these and/or other metrics, roam manager 24 determines whether a selected one of transceiver stations 18 in the selection group should be chosen as a primary transceiver station 18 at step 118. If not, packets continue to stream according to the selection group, and roam manager 24 continues monitoring selection group transceiver stations 18.

However, if roam manager 24 determines a primary transceiver station 18, roam manager 24 may then terminate roaming and remove the selection group associated with mobile unit 12. To terminate roaming, roam manager 24 directs mobile unit 12 to discontinue communications with non-primary transceiver stations 18 at step 120. For example, roam manager 24 may instruct mobile unit 12 to discontinue receiving communications on the Walsh code/frequency combinations assigned to the non-primary transceiver stations 18. Roam manager 24 may also direct the non-primary transceiver stations 18 to discontinue communications with mobile unit 12 at step 122. This may include, for example, roam manager 24 instructing these transceiver stations 18 to discontinue transmitting outbound packets to mobile unit 12 and to discontinue receiving inbound packets on the Walsh code/frequency combination assigned to mobile unit 12.

In addition, roam manager 24 removes the selection group associated with mobile unit 12 at step 124. To remove the selection group, roam manager 24 may propagate a command through managed network 14. For example, roam manager 24 may instruct elements of managed network 14 to discard selection group information and to discontinue selecting between packets from mobile unit 12 based on the selection group information. After removing the selection group and terminating roaming, roam manager 24 returns to monitoring the remaining wireless link between transceiver station 18 and mobile unit 12.

While this flowchart illustrates an exemplary method, system 10 contemplates using any suitable techniques and equipment for managing roaming of mobile unit 12. As previously discussed, this includes the distribution or centralization of decision making components. For example, many of the steps performed by roam manager 24 may be implemented by various components within system 10, such as transceiver stations 18, gateways 20, or other suitable equipment. In addition, while this flowchart illustrates the establishment of a static selection group, system 10 contemplates using soft roaming and dynamic selection groups as described above. Also, many of the steps in this flowchart may take place simultaneously and/or in different orders than as shown. Furthermore, system 10 contemplates using methods with additional steps, fewer steps, or different steps, so long as the methods remain appropriate for establishing selection groups to select between copies of packets received.

FIG. 8 is a flowchart illustrating a method for an element in managed network 14 to participate in a selection group hierarchy. This description focuses on the operation of a particular router 42 in managed network 14. Router 42 receives selection group information from roam manager 24 at step 150. This information may include data such as mobile unit 12 associated with the selection group, transceiver stations 18 in the selection group, a metric to use in selecting between packets, or other suitable information. Based on this information and network topology information, router 42 may determine an appropriate position in a selection group hierarchy at step 152. For example, router 42 may determine a single network address for the next higher level in a hierarchy and multiple network addresses for the next lower level of the hierarchy. As routers 42 in managed network 14 perform these determinations, they may form a packet voting hierarchy similar to hierarchy 40 discussed above. Router 42 may then store the selection group information, including any network addresses, using any appropriate methods and devices at step 154.

Router 42 monitors communications from other components in system 10 at step 156. Router 42 determines whether an indication to remove the selection group has been received at step 158. If so, router 42 removes the selection group information and completes processing of this selection group. If the selection group has not been removed, router 42 determines whether a graded packet originating from mobile unit 12 has been received at step 162. Upon receiving a copy of an inbound packet in the form of a graded packet, router 42 may then access selection group information at step 164. In this step, router 42 may determine how many copies of the inbound packet should be received before selecting and forwarding one of the graded packets. Router 42 may access packet identifiers, such as a sequence numbers, to determine the group of packets from which to select. Thus, router 42 determines whether all copies of this inbound packet have been received at step 166. If not, router 42 determines whether to continue waiting for all expected graded packets at step 168.

If the timeout has not been reached and all of the graded packets have not been received, router 42 continues checking for graded packets at step 166. However, upon timing out or receiving all expected graded packets, router 42 selects one of the graded packets at step 170. This includes router 42 comparing metrics encoded in the graded packets or using any other suitable technique for selecting between the graded packets. If a timeout has occurred, router 42 may also generate an error message. Router 42 then forwards the selected packet to the component in the next level up in the selection group hierarchy at step 172 and then continues monitoring communications at step 156.

While this flowchart illustrates an exemplary method, system 10 contemplates using any suitable techniques and equipment for packet voting among multiple copies of packets. Moreover, many of the steps in this flowchart may take place simultaneously and/or in different orders than as shown. In addition, system 10 contemplates using methods with additional steps, fewer steps, or different steps, so long as the methods remain appropriate for packet voting among multiple copies of packets.

Figure 9:
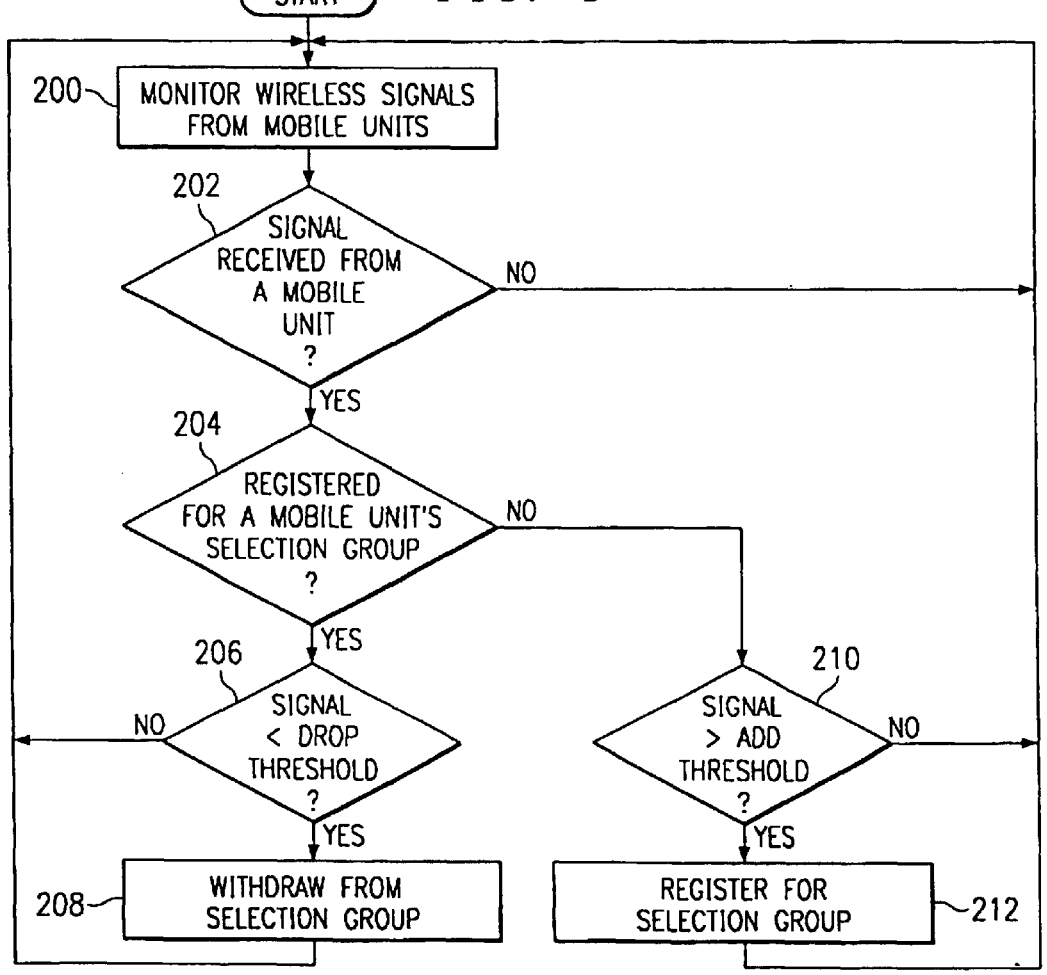
FIG. 9 is a flowchart illustrating a method for registering and withdrawing from selection groups associated with mobile units.

FIG. 9 is a flowchart illustrating a method for registering and withdrawing from selection groups associated with mobile units. For the description of this flowchart, transceiver station 18 performs each of the steps. However, system 10 contemplates any of the components of system 10, such as roam manager 24, performing some or all of the steps described.

Transceiver station 18 monitors wireless signals from mobile units 12 at step 200. This includes transceiver station 18 monitoring control channels, communications sessions, and/or other transmissions from mobile units 12. For example, transceiver station 18 may attempt to receive any signals from mobile units 12 that wireless interface 64 of transceiver station 18 detects. Transceiver station 18 determines whether any signals have been received at step 202 and, if not, continues monitoring signals at step 200. However, if a signal has been received from mobile unit 12, transceiver station 18 determines whether it is currently registered for the selection group for that mobile unit 12 at step 204.

If transceiver station 18 is registered for the selection group associated with mobile unit 12, transceiver station 18 determines whether to remain in the selection group. Thus transceiver station 18 determines whether the signal indicates that wireless communications have dropped below a drop threshold at step 206. To satisfy this determination, transceiver station 18 may delay until multiple signals below the drop threshold have been received or until signals have fallen below the drop threshold for a predetermined period of time. Alternatively, transceiver station 18 may determine whether it has ceased receiving any signals from mobile unit 12. However, if the signal (or signals) have not dropped below the drop threshold, transceiver station 18 resumes monitoring signals at step 200.

If the signal has dropped below the drop threshold, transceiver station 18 withdraws from the selection group associated with mobile unit 12 at step 208 and then resumes monitoring signals. After withdrawing from the selection group, transceiver station 18 ceases to participate as a link for communications sessions established by mobile unit 12. That is, for communications sessions established by mobile unit 12 with remote devices, transceiver station 18 will not forward inbound or outbound communications. For example, in a CDMA system, transceiver station 18 may discontinue receiving session communications from mobile unit 12 on a Walsh code/frequency combination associated with transmissions from mobile unit 12. Transceiver station 18 may also instruct mobile unit 12 to discontinue receiving communications from transceiver station 18 on a particular Walsh code/frequency combination.

If transceiver station 18 determines that it is not registered for the selection group associated with mobile unit 12 at step 204, transceiver station 18 determines whether to register as a member of the selection group. Thus transceiver station 18 determines whether the signal indicates that wireless communications have exceeded an add threshold at step 210. As with the drop threshold, transceiver station 18 may delay until multiple signals above the add threshold have been received or until signals have exceeded the add threshold for a predetermined period of time. If not, transceiver station 18 resumes monitoring signals at step 200.

However, if the signal (or signals) have exceeded the add threshold, transceiver station 18 registers for the selection group associated with mobile unit 12 at step 212 and then resumes monitoring signals at step 200. As a member of the selection group, transceiver station 18 participates as a link in communications sessions, such as telephone calls, established by mobile unit 12 with remote devices. For example, in a CDMA system, transceiver station 18 may begin receiving session communications from mobile unit 12 on a Walsh code/frequency combination associated with transmissions from mobile unit 12. Transceiver station 18 may also instruct mobile unit 12 to begin receiving communications from transceiver station 18 on a particular Walsh code/frequency combination.

While this flowchart illustrates an exemplary method, system 10 contemplates using any suitable techniques and equipment for managing membership, registration, and removal from selection groups associated with mobile units 12. For example, many of the steps in this flowchart may be performed by components other than transceiver station 18. Moreover, many of the steps in this flowchart may take place simultaneously and/or in different orders than as shown. In addition, system 10 contemplates using methods with additional steps, fewer steps, or different steps, so long as the methods remain appropriate for managing membership of, registration to, and removal from selection groups associated with mobile units 12.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A communications system comprising:

a mobile unit operable to transmit information;

a first base transceiver station (BTS) operable to receive the information, determine a first value for a metric associated with communications between the mobile unit and the first BTS, and generate a first graded packet encoding the first value and the information;

a second BTS operable to receive the information, determine a second value for a metric associated with communications between the mobile unit and the second BTS, and generate a second graded packet encoding the second value and the information; and a router operable to receive selection group information, wherein the selection group information identifies the mobile unit, the first BTS, and the second BTS, to determine a selection group hierarchy using the selection group information, to determine a network address for communications from the mobile unit based on the selection group hierarchy, to receive the first graded packet and the second graded packet, to select one of the graded packets for further communication, and to forward the selected one of the graded packets to the network address.

2. The system of claim 1, wherein the router is further operable to:

receive an outbound packet that includes a destination indicating the mobile unit;

determine a plurality of second network addresses for communications to the mobile unit based on the selection group hierarchy; and forward the outbound packet to the first BTS and the second BTS based on the determination.

3. The system of claim 1, further comprising a roam management module operable to:

monitor a quality metric associated with communications between the mobile unit and the first BTS;

determine that the quality metric has fallen below a threshold;

direct the router to select from graded packets associated with the mobile unit received from the first BTS and the second BTS;

direct the first BTS and the second BTS to communicate with the mobile unit; and direct the mobile unit to communicate with the first BTS and the second BTS.

4. The system of claim 1, further comprising a roam management module operable to:

monitor selection criteria associated with communications between the mobile unit and the first BTS and communications between the mobile unit and the second BTS;

select the second BTS based on the selection criteria;

direct the mobile unit to discontinue communications with first BTS;

direct the first BTS to discontinue communications with the mobile unit; and direct the router to discontinue selecting from graded packets associated with the mobile unit received from the first BTS and the second BTS.

5. The system of claim 4, wherein the selection criteria comprise a first signal strength for communications between the mobile unit and the first BTS and a second signal strength for communications between the mobile unit and the second BTS.

6. The system of claim 1, wherein the mobile unit is further operable to transmit a packet encoding the information.

7. The system of claim 1, wherein the information comprises voice information received from a user of the mobile unit.

8. A network device comprising:

an interface operable to receive selection group information, wherein the selection group information identifies a mobile unit, a first base transceiver station (BTS), and a second BTS, to receive a first graded packet from the first BTS, wherein the first graded packet encodes information received from the mobile unit and a first value generated by the first BTS, and to receive a second graded packet from the second BTS, wherein the second graded packet encodes the information and a second value generated by the second BTS; and a processor operable to determine a selection group hierarchy using the selection group information, to determine a network address for communications from the mobile unit based on the selection group hierarchy, and to select one of the graded packets based on the first value and the second value;

wherein the interface is further operable to forward the selected one of the graded packets to the network address.

9. The network device of claim 8, wherein the selection group information identifies a plurality of candidate BTSs determined in response to a signal strength associated with a primary BTS falling below a threshold.

10. The network device of claim 8, wherein:

the interface is further operable to receive an indication to discontinue use of the selection group hierarchy and to use a primary BTS, wherein the primary BTS is one of the first BTS and the second BTS selected in response to a signal strength associated with the primary BTS rising above a threshold.

11. The network device of claim 8, wherein:
the processor is further operable to determine a plurality of second network addresses for communications to the mobile unit based on the selection group hierarchy; and
the interface is further operable to receive an outbound packet that includes a destination indicating the mobile unit and to forward copies of the outbound packet to each of the second network addresses.

12. The network device of claim 8, wherein:
the first value is at least one of a signal strength, a signal-to-noise ratio, a bit error rate, and a carrier-to-noise ratio for a wireless link between the mobile unit and the first BTS; and
the second value is at least one of a signal strength, a signal-to-noise ratio, a bit error rate, and a carrier-to-noise ratio for a wireless link between the mobile unit and the second BTS.

13. The network device of claim 8, wherein the interface communicates packets associated with a communications session established by the mobile unit using Internet Protocol (IP) communications.

14. The network device of claim 8, wherein the information comprises voice information received from a user of the mobile unit.

15. A method for routing packets comprising:
receiving selection group information, wherein the selection group information identifies a mobile unit, a first station, and a second station;
receiving a first graded packet from the first station, wherein the first graded packet encodes information received from the mobile unit and a first value generated by the first station;
receiving a second graded packet from the second station, wherein the second graded packet encodes the information and a second value generated by the second station;
determining a selection group hierarchy using the selection group information;
determining a network address for communications from the mobile unit based on the selection group hierarchy;
selecting one of the graded packets based on the first value and the second value; and
forwarding the selected one of the graded packets to the network address.

16. The method of claim 15, wherein the selection group information identifies a plurality of candidate BTSs determined in response to a signal strength associated with a primary BTS falling below a threshold.

17. The method of claim 15, further comprising:
receiving an indication to discontinue use of the selection group hierarchy and to use a primary BTS, wherein the primary BTS is one of the first BTS and the second BTS selected in response to a signal strength associated with the primary BTS rising above a threshold.

18. The method of claim 15, further comprising:
determining a plurality of second network addresses for communications to the mobile unit based on the selection group hierarchy;
receiving an outbound packet that includes a destination indicating the mobile unit; and
forwarding copies of the outbound packet to each of the second network addresses.

19. The method of claim 15, wherein:
the first value is at least one of a signal strength, a signal-to-noise ratio, a bit error rate, and a carrier-to-noise ratio for a wireless link between the mobile unit and the first station; and
the second value is at least one of a signal strength, a signal-to-noise ratio, a bit error rate, and a carrier-to-noise ratio for a wireless link between the mobile unit and the second station.

20. The method of claim 15, further comprising communicating packets associated with a communications session established by the mobile unit using Internet Protocol (IP) communications.

21. The method of claim 15, wherein the information comprises voice information received from a user of the mobile unit.

22. Software for routing packets, the software embodied on a computer readable medium and operable to:
receive selection group information, wherein the selection group information identifies a mobile unit, a first station, and a second station;
receive a first graded packet from the first station, wherein the first graded packet encodes information received from the mobile unit and a first value generated by the first station;
receive a second graded packet from the second station, wherein the second graded packet encodes the information and a second value generated by the second station;
determine a selection group hierarchy using the selection group information;
determine a network address for communications from the mobile unit based on the selection group hierarchy;
select one of the graded packets based on the first value and the second value; and
forward the selected one of the graded packets to the network address.

23. The software of claim 22, wherein the selection group information identifies a plurality of candidate BTSs determined in response to a signal strength associated with a primary BTS falling below a threshold.

24. The software of claim 22, further operable to:
receive an indication to discontinue use of the selection group hierarchy and to use a primary BTS, wherein the primary BTS is one of the first BTS and the second BTS selected in response to a signal strength associated with the primary BTS rising above a threshold.

25. The software of claim 22, further operable to:
determine a plurality of second network addresses for communications to the mobile unit based on the selection group hierarchy;
receive an outbound packet that includes a destination indicating the mobile unit; and
forward copies of the outbound packet to each of the second network addresses.

26. The software of claim 22, wherein:
the first value is at least one of a signal strength, a signal-to-noise ratio, a bit error rate, and a carrier-to-noise ratio for a wireless link between the mobile unit and the first station; and
the second value is at least one of a signal strength, a signal-to-noise ratio, a bit error rate, and a carrier-to-noise ratio for a wireless link between the mobile unit and the second station.

27. The software of claim 22, further operable to communicate packets associated with a communications session established by the mobile unit using Internet Protocol (IP) communications.

28. The software of claim 22, wherein the information comprises voice information received from a user of the mobile unit.

29. A network device comprising:

means for receiving selection group information, wherein the selection group information identifies a mobile unit, a first station, and a second station;

means for receiving a first graded packet from the first station, wherein the first graded packet encodes information received from the mobile unit and a first value generated by the first station;

means for receiving a second graded packet from the second station, wherein the second graded packet encodes the information and a second value generated by the second station;

means for determining a selection group hierarchy using the selection group information;

means for determining a network address for communications from the mobile unit based on the selection group hierarchy;

means for selecting one of the graded packets based on the first value and the second value; and means for forwarding the selected one of the graded packets to the network address.

30. The network device of claim 29, wherein the selection group information identifies a plurality of candidate BTSs determined in response to a signal strength associated with a primary BTS falling below a threshold.

31. The network device of claim 29, further comprising:

means for receiving an indication to discontinue use of the selection group hierarchy and to use a primary BTS, wherein the primary BTS is one of the first BTS and the second BTS selected in response to a signal strength associated with the primary BTS rising above a threshold.

32. The network device of claim 29, further comprising:

means for determining a plurality of second network addresses for communications to the mobile unit based on the selection group hierarchy;

means for receiving an outbound packet that includes a destination indicating the mobile unit; and means for forwarding copies of the outbound packet to each of the second network addresses.

33. The network device of claim 29, wherein:

the first value is at least one of a signal strength, a signal-to-noise ratio, a bit error rate, and a carrier-to-noise ratio for a wireless link between the mobile unit and the first station; and the second value is at least one of a signal strength, a signal-to-noise ratio, a bit error rate, and a carrier-to-noise ratio for a wireless link between the mobile unit and the second station.

34. The network device of claim 29, further comprising means for communicating packets associated with a communications session established by the mobile unit using Internet Protocol (IP) communications.

35. The network device of claim 29, wherein the information comprises voice information received from a user of the mobile unit.

36. A communications system comprising:

a mobile unit operable to transmit information;

a plurality of base transceiver stations (BTSs) each operable to receive the information, to determine a value for a metric associated with communications between the mobile unit and the respective BTS, and to generate a graded packet encoding the value and the information;

a plurality of routers each operable to receive selection group information, wherein the selection group information identifies the mobile unit and the plurality of BTSs, to determine a selection group hierarchy using the selection group information, to determine a network address of a second router for communications from the mobile unit based on the selection group hierarchy, to receive a plurality of graded packets, to select one of the graded packets for further communication, and to forward the selected one of the graded packets to the second router using the network address.

37. The communications system of claim 36, wherein each graded packet includes an identifier for the mobile unit, content including voice information, a metric indicating quality of a wireless link, and a packet identifier that allows the routers to select between the respective graded packet and other graded packets having identical packet identifiers.

38. The communication system of claim 37, wherein the metric is at least one of a signal strength, a signal-to-noise ratio, a bit error rate, and a carrier-to-noise ratio for the wireless link.

* * * * *